Figure 1:
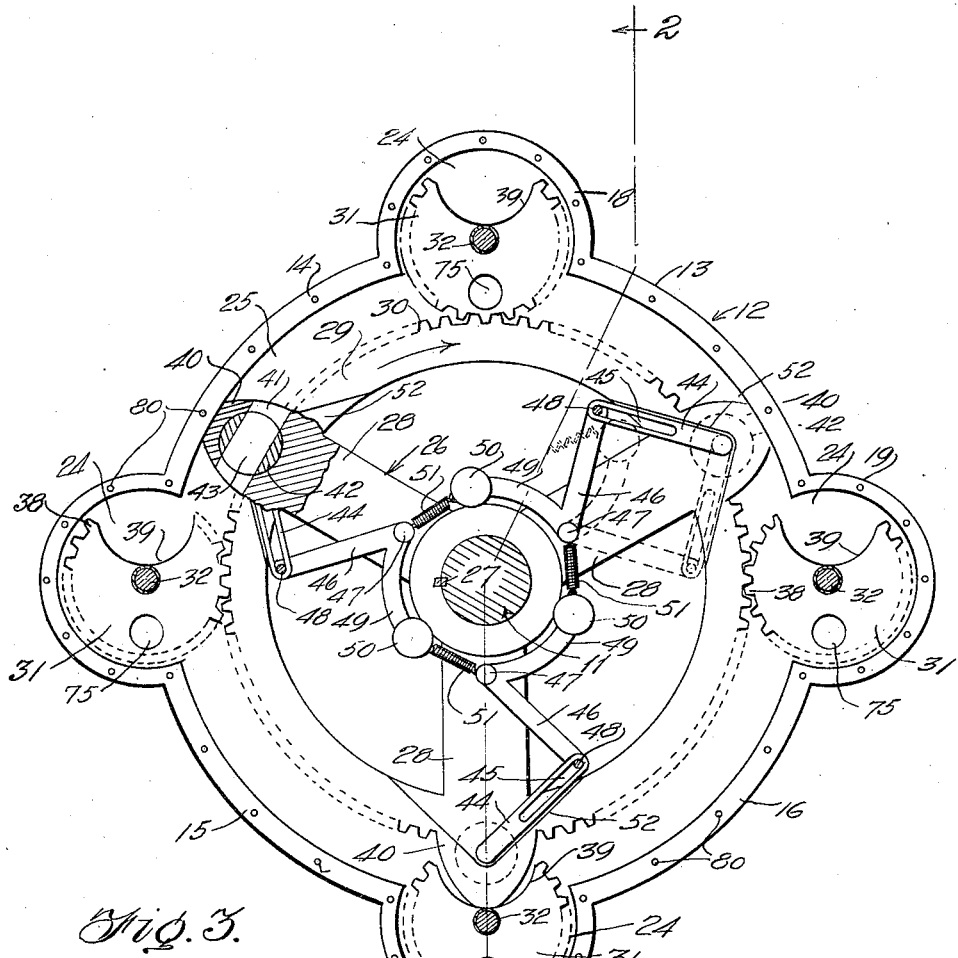

Oct. 10, 1939.  M. C. PERKINS  2,175,970
HYDRAULIC TRANSMISSION
Filed June 28, 1938    2 Sheets-Sheet 1

Inventor
MART C. PERKINS,
By Kimmel & Crowell,
Attorneys

Oct. 10, 1939.  M. C. PERKINS  2,175,970
HYDRAULIC TRANSMISSION
Filed June 28, 1938  2 Sheets-Sheet 2

Inventor
MART C. PERKINS,
By Kimmel & Crowell
Attorneys

Patented Oct. 10, 1939

2,175,970

UNITED STATES PATENT OFFICE 2,175,970

HYDRAULIC TRANSMISSION

Mart C. Perkins, Casper, Wyo.

Application June 28, 1938, Serial No. 216,369

7 Claims. (Cl. 192—58)

This invention relates to transmissions and more particularly to a transmission of the hydraulic type.

An object of this invention is to provide a hydraulic transmission and centrifugally operated means for coupling a drive shaft with a driven shaft.

Another object of this invention is to provide in a transmission of this kind means whereby the coupling devices associated therewith will automatically move to an uncoupled position when the drive shaft is stationary.

A further object of this invention is to provide an exceedingly simple transmission wherein a fluid is positioned in a housing and a rotor disposed in the housing and within the fluid, the rotor carrying means whereby the driven portion of the device will automatically be operated by the drive portion thereof upon rotation of the drive portion.

A still further object of this invention is to provide a hydraulic transmission of this type wherein the coupling between the drive portion and the driven portion may be gaged so as to secure the desired rotation of the driven portion relative to the drive portion at varying speeds of the drive portion.

To the foregoing objects and to others which may hereinafter appear, the invention consists of the novel construction combination and arrangement of parts as will be more specifically referred to and illustrated in the accompanying drawings wherein are disclosed embodiments of the invention, but it is to be understood that changes, variations and modifications may be resorted to which fall within the scope of the invention as claimed.

Figure 2:
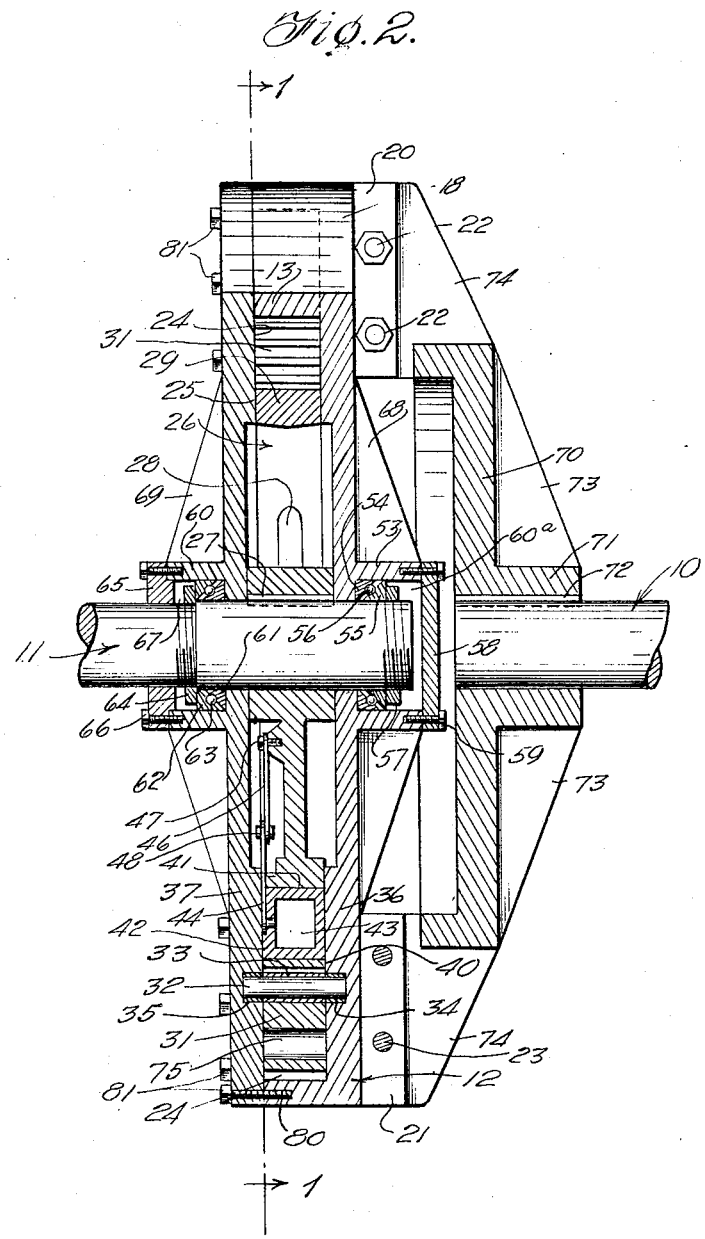

In the drawings:

Figure 1 is a vertical section of an automatic transmission constructed according to an embodiment of this invention, the section being taken on line 1—1 of Figure 2, Figure 2 is a sectional view taken on the line 2—2 of Figure 1, Figure 3 is a fragmentary sectional view similar to Figure 1 showing a modified form of this structure.

Referring to the drawings the numeral 10 designates a drive shaft which is adapted to be connected to a suitable source of power supply and the numeral 11 designates a driven shaft which is adapted to be coupled by the means hereinafter described to the drive shaft 10. The driven shaft 11 is disposed in axial alignment with the drive shaft 10.

A transmission housing generally designated as 12 is disposed about the driven shaft 11 and comprises a disc-shaped wall 36 having a plurality of arcuate flanges 13, 14, 15 and 16 integral therewith. The housing 12 is also provided with a plurality of circumferentially spaced apart abutment chambers 24 formed with an outwardly extending wall 18 integral with the wall 36 and an arcuate wall or flange 19 integral with adjacent arcuate flanges. The arcuate flanges 13, 14, 15 and 16 form a cylinder 25 and the abutment chambers 24 open into the cylinder 25. A cover or wall 37 is secured to the flanges 13, 14, 15, 16 and 19 by means of bolts 81 which are threaded into openings 80 provided in the flanges.

A gear member 26 is fixedly secured to the driven shaft 11 being secured by means of a key 27. The gear 26 is provided with a plurality of radially disposed spokes or arms 28 to which the rim or annular portion 29 is secured or formed integral therewith. The gear 26 is constructed in the form of a spur gear and the teeth 30 thereof project into the cylinder 25.

Each abutment chamber 24 has positioned therein a rotatable abutment 31 which is mounted on a shaft 32 and preferably a bushing or bearing sleeve 33 is provided in the abutment 31 and the opposite ends of the abutment shaft 32 are journalled in bearings 34 and 35 provided in the opposite walls 36 and 37 of the housing 12. The abutment 31 is provided with gear teeth 38 which mesh with the gear teeth 30 so that the abutment 31 will rotate with the rotation of the gear 26. A counterbalancing recess or hole 75 is provided in each abutment so as to reduce vibration thereof.

Each abutment 31 is provided with a piston recess 39 in which a piston 40 carried by the gear 26 is adapted to engage. The gear 26 in the present instance is provided with three pistons 40 which are circumferentially spaced apart and are slidable in the cylinder 25. The pistons 40 in the present instance are formed integrally with the gear 26. Each piston 40 is provided with a fluid passage 41 therethrough within the cylinder 25 so that when the cylinder 25 is filled with fluid the movement of the piston 40 relative to the housing 12 will be permitted by the fluid in the cylinder 25 passing through the aperture or passage 41. The piston 40 is adapted to engage in a piston recess 39 of an abutment upon rotation of the housing 12 relative to the gear 26 or upon rotation of the gear 26 relative to the housing 12.

A valve plug 42 is carried by each piston 40 and is provided with an opening 43 therethrough which is adapted to control the flow of fluid in the cylinder 25 through the aperture 41. The valve plug 42 has secured thereto a lever or crank arm 44 provided with an elongated slot 45. A bell crank 46 which is mounted on a bolt or pin 47 secured to a spoke or arm 28 of the gear 26 is provided with a headed pin 48 slidably engaging in the slot 45 so that upon rocking of the bell crank 46 the valve plug 42 will be rocked to either open or closed position. One arm 49 of the bell crank 46 is preferably of longitudinally arcuate configuration and is provided with a weight 50 at the free end thereof. A spring 51 is secured at one end to the outer end of the crank arm 49 and in the present instance is secured to a weight 50. The opposite end of the spring 51 is secured to an adjacent pin or bolt 47 so that bell crank 46 will be normally biased or urged to an inoperative or neutral position. The side of the gear 26 is preferably provided with a recess or slot 52 in which the crank or lever 44 engages.

The plate 36 is provided with a cylindrical hub portion 53 in which an anti-friction bearing is adapted to engage. The anti-friction bearing comprises a race member 54 which in the present instance is of transversely triangular configuration and engages in the inner end or bottom of the hub portion 53. An outer race or thrust member 55 is disposed on the shaft 11 and balls 56 are interposed between the two race members. A retaining ring 57 is threadedly mounted on the shaft 11 so as to retain the anti-friction bearing comprising the race members 54, 55 and the balls 56 in assembled condition. A plate or closure 58 is secured to the outer end of the hub 53 by means of bolts or screws 59. A lubricating chamber 60ª is formed within the hub 53 and the plate 58 acts as a sealing means for the lubricant so that the anti-friction bearing will be properly lubricated at all times.

The plate member 37 is provided with a cylindrical hub 60 engaging about the shaft 11 and a race member 61 is disposed about the shaft 11. A second race member 62 is disposed in the hub 60 and ball bearings 63 are interposed between the two race members 61 and 62. These anti-friction bearing members are disposed in opposite relation so as to take up the thrust of the shaft 11 in opposite directions. A retaining nut or ring 64 is threaded onto the shaft 11 and engages against the outer race member 62. A plate 65 is secured as by bolts or screws 66 to the outer end of the hub 60 and seals the lubricating chamber 67 formed between the plate 65 and the anti-friction bearing.

A plurality of radially arranged ribs or bracing members 68 are cast integral with the hub member 53 and with the plate 36 and a plurality of radially arranged ribs and bracing members 69 are cast integral with the plate 37 and the hub member 60.

An annular member 70 which is provided with an axially disposed hub 71 is secured as by a key 72 to the drive shaft 10. This member 70 is provided with a plurality of radially arranged ribs or bracing members 73 having extensions 74 which are adapted to engage flanges 20 and 21 and are secured thereto by means of the bolts 22 and 23. In this manner the drive shaft 10 is fixedly connected to the housing 12.

In Figure 3 there is disclosed a slightly modified form of this structure wherein the housing 12ª has a gear 26ª rotatable in the interior thereof and the housing 12ª is provided with a cylinder 25ª similar to the cylinder 25. A plurality of circumferentially spaced apart pistons 40ª are secured to the gear 26ª and each piston is provided with an aperture 41ª therethrough. A valve plug 42ª is carried by each piston 40ª and is provided with an opening 43ª therethrough. A valve operating lever or crank arm 44ª is secured at one end to the valve plug 42ª and is provided with an elongated slot 45ª therein. The valve plug 42ª is operated by means of a bell crank 46ª which is normally urged to an inoperative position by means of a spring 51ª. In this instance, when the bell crank 46ª is in an inoperative or neutral position the valve plug 42ª is in a closed position whereas in the structure shown in Figure 1 when the bell crank 46 is in an innermost or inoperative position, the valve plug 42 is in an open position.

In the use and operation of this transmission the interior of the housing 12 is adapted to be filled with a liquid which may be oil or other desired liquid and the drive shaft 10 is connected to a suitable source of power. The driven shaft 11 may be connected to a driven member and upon rotation of the drive shaft 10 the housing 12 will be rotated therewith.

Initially the rotation of the housing 12 will not effect any movement between this housing and the driven shaft 11 as the initial slow rotation of the housing 12 will be such as to permit the fluid in the cylinder 25 to flow through the aperture 41 of a piston 40 and through the opening 43 of a valve plug 42 between adjacent pairs of rotatable abutments 31. However, if the drive shaft 10 and the housing or the casing 12 is increased in rotation the pressure of the fluid caused by movement of the housing 12 and the pistons 40 will gradually effect rotation of the gear 25 and the driven shaft 11. As the speed of the driven shaft 11 increases the bell cranks 46 will be swung outwardly on their pivots 47 so as to gradually effect a closing or restriction of the passage 41 in piston 40. The gradual restriction of the passage 41 by rotation of the valve plug 42 to a closed position will gradually effect an increased rotation of the driven shaft 11 until the valve plug 42 is rocked to a closed position. At this time the driven shaft 11 will be rotated at the same speed as the drive shaft 10.

The abutments 31 are rotated entirely by meshing of the teeth of the abutments with the teeth of the gear carrying the pistons 40. When the abutments are rotated to a point where the teeth thereon are interrupted further rotation of the abutments is effected by engagement of a piston 40 in the recess 39 of the abutment. The teeth on the abutment are so arranged as to bring the recess 39 into a position to admit the entrance of a piston 40 therein. At the time a piston 40 initially enters the recess 39 the teeth of the abutment are still in engagement with the teeth 30 of the piston carrier and it is only when the last tooth of an abutment is disengaged from a tooth of the carrier that the piston 40 causes the abutment to rotate in order that the first tooth on the abutment on the opposite side of the piston may come into engagement with an adjacent tooth 30 of the piston carrier.

The openings 43 in the valve 42 are proportionately smaller than the diameter of the cylinder so that if the cylinder is rotated and the pistons are stationary there will be set up on one side of each piston an active force which will cause the liquid to move through the valve openings 43, and it is only the size of each opening 43 which determines the initial moment of movement of the pistons relative to the cylinder or the casing. The size of the openings 43 will depend in part upon how fast it is desired to rotate the casing 12 before the pistons and the piston carrier begin to rotate, and in part upon the viscosity of the liquid which is used in the cylinder. In other words, if the fluid is relatively heavy, the valve openings 43 should be larger than if the liquid is relatively light.

In the modification disclosed in Figure 3 the driven shaft 11a will initially operate at the same speed as the drive shaft but as the speed of the drive shaft is increased the valve plug 42a will be gradually moved to an open position so as to permit the flow of the fluid through the piston 40a so that the gradual increase in speed of the drive shaft will effect a proportionate decrease in the speed of the driven shaft 11a relative thereto by means of the weighted bell crank 46a.

What I claim is:

1. A transmission as set forth, comprising a rotatable housing adapted to be connected to a drive means, a driven shaft journalled in said housing, a gear secured to said driven shaft within said housing, an annular cylinder in said housing, radially arranged abutment chambers carried by said housing, a toothed rotatable abutment in each chamber meshing with said gear, radially arranged pistons integral at their inner ends with the outer edge of and bodily carried by said gear and slidable in said cylinder, each abutment having a recess in which a piston is adapted to engage, each of said pistons having an aperture therethrough spaced outwardly from said edge to admit the passage of a liquid from one side of a piston to the opposite side upon rotation of said housing, a ported rotatable valve plug within and for controlling each aperture, and a centrifugally actuated spring controlled linkage mechanism common to and for operating said plugs, said mechanism encompassing the hub of the gear, connected at a plurality of points to the gear outwardly adjacent said hub and slidably connected with each of the plugs.

2. A transmission as set forth comprising a rotatable housing adapted to be connected to a drive means, a driven shaft journalled in said housing, a gear secured to said driven shaft within said housing, an annular cylinder in said housing, radially arranged abutment chambers carried by said housing, a toothed rotatable abutment in each chamber meshing with said gear, radially arranged pistons carried by said gear and slidable in said cylinder, each abutment having a recess in which a piston is adapted to engage, each of said pistons having an aperture therethrough to admit the passage of a liquid from one side of a piston to the oposite side upon rotation of said housing, a valve plug intersecting each aperture, a slotted arm fixed to each plug, a plurality of bell cranks rockably carried by said gear, a weight carried by one arm of each bell crank, and a slidable connection between the other arm of said bell crank and said valve plug.

3. A transmission as set forth comprising a housing, means securing said housing to a drive shaft for rotation, a driven gear in said housing, an annular cylinder, a plurality of pistons carried by and extending outwardly from the outer edge of said gear and slidable in said cylinder, a plurality of circumferentially spaced apart abutment chambers communicating with said cylinder, a rotary abutment in each chamber, gear teeth carried by each abutment meshing with said gear, each piston having a passage therethrough within said cylinder and disposed completely outward of the said edge, a valve plug intersecting said passage, a centrifugally operated spring controlled mechanism carried by said gear, common to the plugs, slidably connected to each for moving it to closed position and including means for normally urging the plug to open position.

4. A transmission as set forth comprising a rotatable housing, means securing said housing to a driving member, an annular cylinder in said housing, a gear rotatable in said housing axially thereof, pistons bodily carried by, extending outwardly from, and interposed between spaced teeth on the toothed edge of said gear, a plurality of abutment chambers carried by said housing communicating with said cylinder, an abutment rotatable in said abutment chamber provided with gear teeth meshing with said gear, each of said pistons having a passage therethrough within said cylinder located outwardly adjacent to said toothed edge, and a centrifugally operated spring controlled rotatable means intersecting said passages whereby to control the speed of rotation of said gear relative to said housing.

5. A transmission as set forth comprising a rotatable housing adapted to be connected to a drive means, a driven shaft journalled in said housing, a gear secured to said shaft in said housing, said gear including a plurality of radially arranged spokes, an annular cylinder in said housing, radially arranged abutment chambers carried by said housing communicating with said cylinder, a toothed rotatable abutment in each chamber meshing with said gear, a plurality of circumferentially spaced apart pistons carried by said gear and slidable in said cylinder, said pistons being disposed in radial alignment with said spokes, each abutment having a recess in which a piston is adapted to engage, each of said pistons having an aperture therethrough to admit the passage of a fluid from one side of a piston to the opposite side upon rotation of said housing, a valve plug intersecting each aperture, and centrifugally actuated operating means for each plug.

6. A transmission as set forth comprising an annular housing, a substantially disc-shaped member disposed laterally of said housing, means carried by said annular member securing said annular member to said housing, means securing a drive shaft to said annular member, a driven shaft, means rotatably securing said driven shaft in said housing, a gear secured to said driven shaft in said housing, an annular cylinder in said housing, a plurality of circumferentially spaced apart abutment chambers carried by said housing and communicating with said cylinder, a toothed rotatable abutment in each chamber meshing with said gear, radially arranged pistons carried by said gear and slidable in said cylinder, each abutment having a recess in which a piston is adapted to engage, each of said pistons having an aperture therethrough to admit the passage of a liquid from one side of a piston to the opposite side upon rotation of said housing, a valve plug intersecting each aperture, and centrifugally actuated operating means for each plug.

7. A transmission as set forth comprising an annular housing, an annular cylinder in said housing, a driven shaft axially of said housing, means rotatably mounting said driven shaft in said housing, a gear fixed to said driven shaft in said housing, said gear including a plurality of radially arranged spokes, a plurality of circumferentially spaced apart pistons secured to said gear and slidable in said cylinder, said pistons being disposed in radial alignment with said spokes, a plurality of circumferentially spaced apart abutment chambers carried by said housing and communicating with said cylinder, outwardly extending flanges carried by said chambers, an annular drive member, means securing said drive shaft, means carried by said drive member and engaging said flanges to secure said drive member to said flanges, each of said pistons having an aperture therethrough within said cylinder, a valve plug intersecting said aperture, a slotted arm carried by each plug, said gear having a slot in which said arm engages, a bell crank for each plug, means pivotally securing said bell crank to a spoke of said gear, means slidably securing one arm of said bell crank to the slotted portion of said first arm, a weight carried by the other arm of said bell crank, and a spring secured at one end to said weight and at the opposite end to an adjacent bell crank pivot whereby to normally bias said weight to an innermost inoperative position.

MART C. PERKINS.